United States Patent
Subbarao et al.

(10) Patent No.: US 9,870,499 B2
(45) Date of Patent: Jan. 16, 2018

(54) BIOMETRIC COLLECTION DEVICE

(71) Applicant: NEC Corporation, Tokyo (JP)

(72) Inventors: Shashidar Subbarao, Rancho Cordova, CA (US); Travis S. Cochran, Costa Mesa, CA (US); Jonathan R. Lucas, Long Beach, CA (US); Katsuhiko Kobayashi, Sagamihara (JP)

(73) Assignee: NEC CORPORATION, Minato-ku, Tokyo (JP)

(*) Notice: Subject to any disclaimer, the term of this patent is extended or adjusted under 35 U.S.C. 154(b) by 79 days.

(21) Appl. No.: 14/824,238

(22) Filed: Aug. 12, 2015

(65) Prior Publication Data

US 2017/0046554 A1 Feb. 16, 2017

(51) Int. Cl.
*G06K 9/00* (2006.01)
*G08B 5/36* (2006.01)

(52) U.S. Cl.
CPC .......... *G06K 9/00013* (2013.01); *G08B 5/36* (2013.01)

(58) Field of Classification Search
USPC ........ 382/124, 126, 128; 340/5.53; 345/168; 361/679.17; 455/558; 713/186; 726/9, 726/28
See application file for complete search history.

(56) References Cited

U.S. PATENT DOCUMENTS

| | | | |
|---|---|---|---|
| 5,222,152 A | 6/1993 | Fishbine et al. | |
| D478,905 S | 8/2003 | Byrne et al. | |
| D487,266 S | 3/2004 | Morimiya | |
| D516,069 S | 2/2006 | Kuroda et al. | |
| D522,510 S | 6/2006 | Su | |
| D542,291 S | 5/2007 | Kang et al. | |
| 7,284,266 B1* | 10/2007 | Morris ............... | H04L 9/0825 713/186 |
| D584,730 S | 1/2009 | Lin et al. | |
| D593,559 S | 6/2009 | Lin et al. | |
| D616,439 S | 5/2010 | Mugica et al. | |
| 7,831,072 B2* | 11/2010 | Rowe ............... | G06K 9/00046 340/5.53 |
| D649,548 S | 11/2011 | Szoke et al. | |
| 8,411,140 B2* | 4/2013 | Adelson ............ | A61B 5/1172 348/135 |
| D697,491 S | 1/2014 | Daniel | |
| D715,800 S | 10/2014 | Cornelison | |
| 9,548,766 B2* | 1/2017 | Norman ............ | H04B 1/0057 |

OTHER PUBLICATIONS

Print-Out of 3M BlueCheck 2U Mobile Identification Handheld Device (2 pages).
Print-Out of Morpho IBIS Extreme Mobile Identification System from Safran Morpho (2 pages).
Print-Out of Morpholdent Handheld Mobile Identification Device from Safran MorphoTrak (2 pages).
Print-Out of Verifier Mw Fingerprint Scanner from Crossmatch, dated Oct. 23, 2014 (2 pages).

\* cited by examiner

*Primary Examiner* — Anh H Do
(74) *Attorney, Agent, or Firm* — Sughrue Mion, PLLC

(57) ABSTRACT

A biometric collection device that includes a housing and a fingerprint sensor. The biometric collection device provides signals to a user by activating a first signal when the biometric collection device is ready to capture a fingerprint image from the fingerprint sensor, activates a second signal when the biometric collection device begins capturing the fingerprint image, and activates a third signal when the biometric collection device successfully captures the fingerprint image.

17 Claims, 2 Drawing Sheets

BIOMETRIC COLLECTION DEVICE

TECHNICAL FIELD

The present invention relates to a biometric collection device and, more particularly, to signals used by such a device.

BACKGROUND

Portions of human skin include uniquely-contoured friction ridges that are used to identify a particular person. For instance, the friction ridges on a finger are often referred to as a fingerprint while those on a hand can be called a palm print. The friction ridges can be captured as an image and later used as a reference for matching a subsequently-gathered fingerprint or palm print. In the past, the image of the friction ridges could be created by inking a person's hand or palm and then carefully pressing the ink against a paper surface.

However, modern electronics can now create images of the friction ridges without paper. Fingerprint scanners receive a person's finger against a surface and create an image of the friction ridges on the finger using modern electronics to thereby capture a fingerprint image. To capture such an image, the fingerprint scanner may need the finger to be positioned relative to the surface in a particular way and according to particular timing. For instance, the fingerprint scanner may be in a standby state and before it can begin capturing fingerprint images the fingerprint scanner must be transitioned to a ready state. However, not all users of fingerprint scanners may readily understand the timing and finger positioning used to successfully capture fingerprint images. And fingerprint scanners may not be accompanied with instructions that a user understands. So it would be helpful to visually communicate instructions or device status to users of fingerprint scanners in a way that transcends language and might not include consulting an owner's manual or other technical instructions.

SUMMARY

According to an embodiment, there is provided a method of providing cues to a biometric collection device user. The method includes activating a first signal when a biometric collection device is ready to capture a fingerprint image; activating a second signal when the biometric collection device begins capturing the fingerprint image; and activating a third signal when the biometric collection device successfully captures the fingerprint image.

According to another embodiment, there is provided a method of providing cues to a biometric collection device user. The method includes activating a first visual signal that identifies a particular finger to be captured; activating a second visual signal when a biometric collection device is ready to capture a fingerprint image of the particular finger; activating a third visual signal when the fingerprint scanner successfully captures the fingerprint image of the particular finger; and activating the first signal that identifies a different finger to be captured.

According to yet another embodiment, there is provided a biometric collection device that includes a housing and a fingerprint sensor. The biometric collection device provides signals to a user by activating a first signal when the biometric collection device is ready to capture a fingerprint image from the fingerprint sensor, activates a second signal when the biometric collection device begins capturing the fingerprint image, and activates a third signal when the biometric collection device successfully captures the fingerprint image.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The biometric collection device described below may include a fingerprint scanner and an interface that can communicate the status of the fingerprint scanner as well as inform the user whether images of fingerprints have been successfully captured. A visual display is one example of an interface that can be included with the fingerprint scanner. The visual display can illuminate one or more lights using different colors, intensities, pulse frequencies, or both. Through the absence or presence of light, intensity of light, choice of color, and/or frequency with which the light is periodically lit, the visual display can communicate with the user of the fingerprint scanner.

Figure 1:
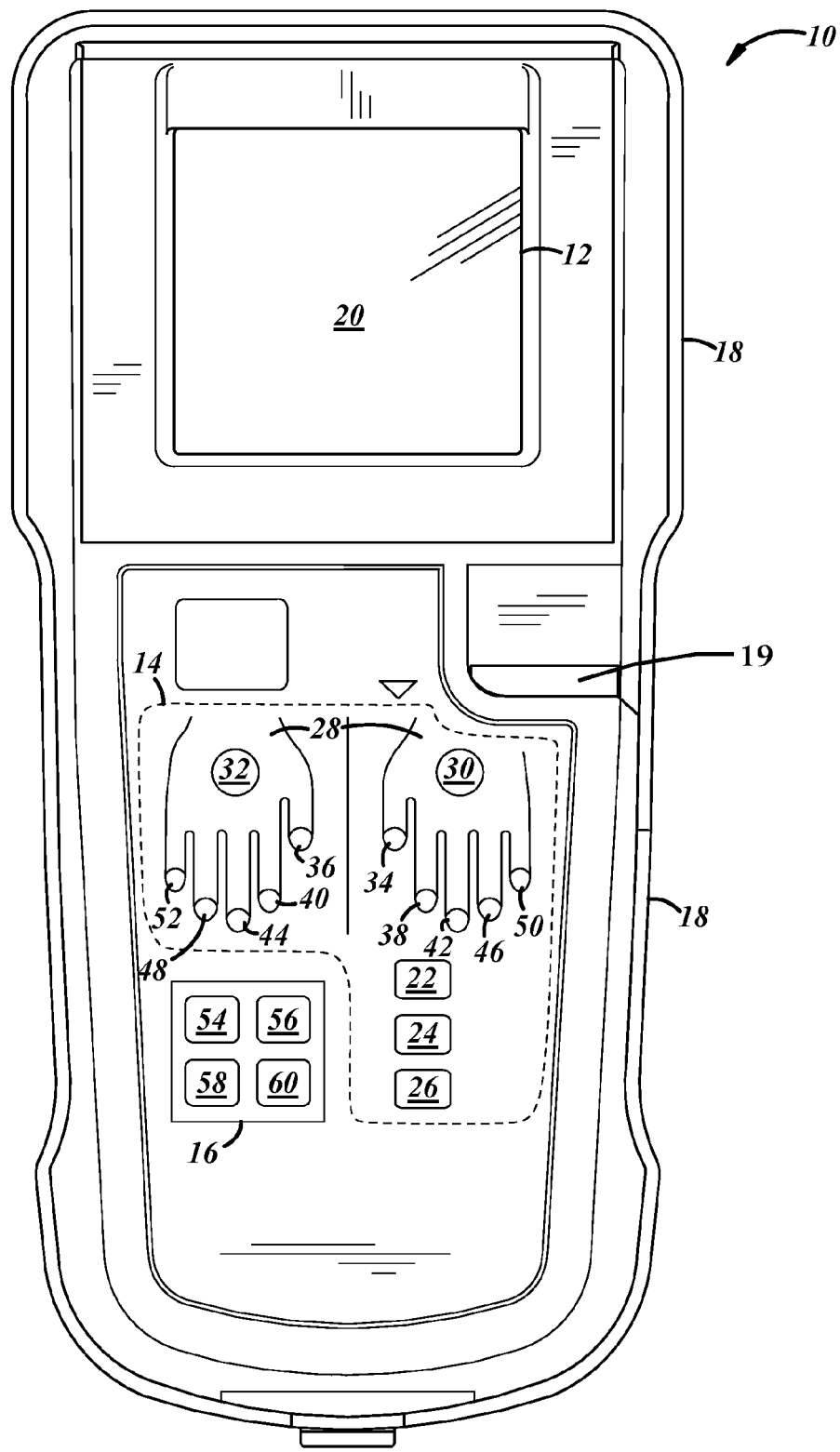
FIG. 1 is a diagrammatic plan view of an embodiment of a biometric collection device.

Turning to FIG. 1, an exemplary embodiment of a fingerprint scanner 10 is shown. The fingerprint scanner 10 depicted in FIG. 1 is generally a handheld device carried by a user who can place one or more fingers against a surface of the scanner 10 and create an image of a person's fingerprint(s). The user generally holds the fingerprint scanner 10 and another person can place their fingers on a fingerprint sensor. This arrangement can be visualized by way of an example involving a police officer (e.g., a user) who captures images of fingerprints from a suspected criminal (e.g., another person). While the embodiment depicted in FIG. 1 is described with respect to a handheld fingerprint scanner, it should be appreciated that the interface or visual display described herein can be used with differently implemented fingerprint scanners, including those that are not handheld.

The fingerprint scanner 10 shown in FIG. 1 can include a fingerprint sensor 12, a visual display 14, and one or more user inputs 16 that control the fingerprint scanner 10. A housing 18 can enclose hardware used to implement the fingerprint scanner 10 while supporting both the visual display 14 and the user inputs 16. In addition, the housing 18 can provide sufficient structure allowing a user to hold the fingerprint scanner 10. In some implementations, the fingerprint scanner 10 can also include a card reader 19 that receives a card and obtains information or data embedded in the card.

The fingerprint sensor 12 includes a surface 20 on which at least a portion of one or more fingers may be placed to permit an image of the fingerprint(s) or other identifying region of those fingers to be captured. One or more fingers can be placed in contact with the surface 20 of the fingerprint sensor 12 and an image of the fingerprints can be obtained. The fingerprint sensor 12 can generate images of the fingerprints in various ways. For example, the fingerprint sensor 12 can use a thin-film transistor (TFT) that generates fingerprint images from both flat captures as well as rolled captures. A flat capture can involve a user placing one or more fingers in static contact with the surface 20 of the fingerprint sensor 12. The fingerprint scanner 10 can then capture an image of the fingerprints of those fingers as they remain motionless (or nearly so) and in contact with the surface 20. Alternatively, the fingerprint sensor 12 can use a rolled capture in which an edge or a side of a finger is initially placed in contact with the surface 20 of the fingerprint sensor 12 and during the image capture the finger is rotated from one edge or side of the finger to an opposite side or edge of the finger thereby exposing the fingerprint to the surface 20 of the fingerprint sensor 12. While the fingerprint sensor 12 in this embodiment is described with respect to the function of a capacitive film such as the TFT, it should be understood that the fingerprint sensor 12 can use different technologies for capturing fingerprint images. For example, an optical sensor could be used to capture an image of a fingerprint.

The visual display 14 includes a plurality of lights that can generate one or more colors and through illumination and color selection communicate information to the user of the fingerprint scanner 10. In this embodiment, the visual display 14 includes a battery level indicator 22, a flat scan/roll scan indicator 24, a wireless local area network (WLAN) indicator 26, and one or more finger indicators 28 as shown within the segmented line in FIG. 1. Each of these indicators can include one or more lights at least some of which may generate one or more colors when illuminated. In addition, the lights of the indicators can be intermittently illuminated such that the lights flash or pulse periodically. Changes in the frequency with which the lights periodically illuminate or flash can convey information to the user. In this example, the fingerprint scanner 10 can use light-emitting diodes (LEDs) to implement its indicator lights. However, the present system and method can also be used with incandescent bulbs as well. The battery level indicator 22 can indicate how much charge is remaining in the battery that supplies voltage to the fingerprint scanner 10. The flat scan/roll scan indicator 24 can include a plurality of lights that communicate to the user whether the scanner 10 is set to obtain a flat capture or a roll capture. Some fingerprint scanners 10 are equipped with an antenna and short-range wireless communication capability, such as those defined by IEEE 802.11 standards, that can establish short-range wireless communication links between the fingerprint scanner 10 and another nearby computer, such as a personal computer (PC), mobile phone or other device. The WLAN indicator 26 can display the existence of a short-range wireless link with another computer or device. The fingerprint scanner 10 can wirelessly send fingerprint images to another device via the short-range wireless link.

The visual display 14 can include a finger indicator 28 that may comprise a plurality of lights. In one implementation, the finger indicator 28 can depict five fingers for each hand of a person and include an individual light for each finger of the hand. As the fingerprint scanner 10 generates a fingerprint image for each finger on a hand, the scanner 10 can communicate progress for each finger using the individual lights of the finger indicator 28. More specifically, the finger indicator 28 can depict a left hand 30 and a right hand 32 each of which includes a thumb light 34, 36, an index finger light 38, 40, a middle finger light 42, 44, a ring finger light 46, 48, and a pinky finger light 50, 52. Each individual light can generate light in one or more than one color to indicate a status of the fingerprint scanner 10. FIG. 1 depicts the outline of the left hand 30 and the right hand 32 shown in a "palm down" orientation with the fingers pointing away from the fingerprint sensor 12 as this mimics the position of a hand as it is scanned by the fingerprint scanner 12. In addition to color, the individual lights can pulse light at varying rates of speed and in some implementations may instead or also vary in intensity. A different rate of pulse—with or without a color change—can indicate different stages of fingerprint image capture. An example of this will be discussed in more detail below.

The user inputs 16 are selectable buttons, switches, or the like that control the operation of the fingerprint scanner 10. The user of the fingerprint scanner 10 can touch or depress an area of the housing 18, such as a momentary switch, that communicates a selection. In this implementation, the user inputs 16 of the fingerprint scanner 10 include a scan function 54, a new person function 56, a skip finger function 58, and a power function 60 that allows the user to turn the scanner 10 on and off. The scan function 54 can allow the user to direct the fingerprint scanner 10 to begin the process of scanning a fingerprint while the new person function 56 can inform the fingerprint scanner 10 that fingerprints for a new person are to be captured. The skip finger function 58 can alert the fingerprint scanner 10 that one or more fingers will not be scanned. For instance, the fingerprint scanner 10 can expect to capture images of all ten fingerprints of a person starting with the right hand, moving from thumb to pinky, and then continuing in a similar way with the left hand. However, a user may want to only record the thumb and middle finger of the right hand. In that event, the user can begin scanning by selecting the scan function 54. After successfully capturing an image of the thumb, the fingerprint scanner 10 may expect to next capture the index finger of the right hand. The user can then skip capturing of the index fingerprint by selecting the skip finger function 58 and proceed to capture the fingerprint of the middle finger of the right hand. The functions can each be associated with a separate momentary switch, such as a button, that communicates a user selection to an central processing unit (CPU) located in the housing 18. The fingerprint scanner 10 could use a variety of different CPUs and communication busses to receive input and generate fingerprint images. One example of the CPU is the SAMA5D3 microprocessor manufactured by Atmel.

The card reader 19 can be implemented using a magnetic card reader capable of reading data-encoded magnetic tape affixed to cards. When a user inserts a pocket-sized card with magnetic tape into a slot used by the reader 19 for receiving such cards, an electric signal can be induced by the movement of the magnetic tape across a sensor used by the card reader 19. The electric signal reflects the data stored in the card. In one implementation, the card reader 19 can be implemented using a Mag Tek 21030028 card reader. While the card reader 19 described with regard to FIG. 1 uses magnetic tape sensors, the reader 19 could be implemented using different technologies, such as those used by integrated circuit cards (ICC) or "smart cards."

The housing 18 provides a structure for carrying the fingerprint sensor 12, the visual display 14, the user inputs 16, and the card reader 19 while protecting the internal electronic hardware used to carry out functionality of the fingerprint scanner 10. Each of the fingerprint sensor 12, the visual display 14, the user inputs 16, and the card reader 19 include an outwardly-facing portion that the user sees and interacts with on an outside surface of the housing 18. These elements can also include an inwardly-facing portion that can be concealed by the housing 18 and protected from the touch of a user or any other environmental exposure. The housing 18 can be made from a wide variety of relatively rigid materials, usually a plastic but the housing 18 could alternatively be formed from metal 18. One commercially-available implementation of the fingerprint scanner 10 capable of implementing the visual display 14 and method disclosed herein is the NeoScan 45 produced by the NEC Corporation of America.

Figure 2:
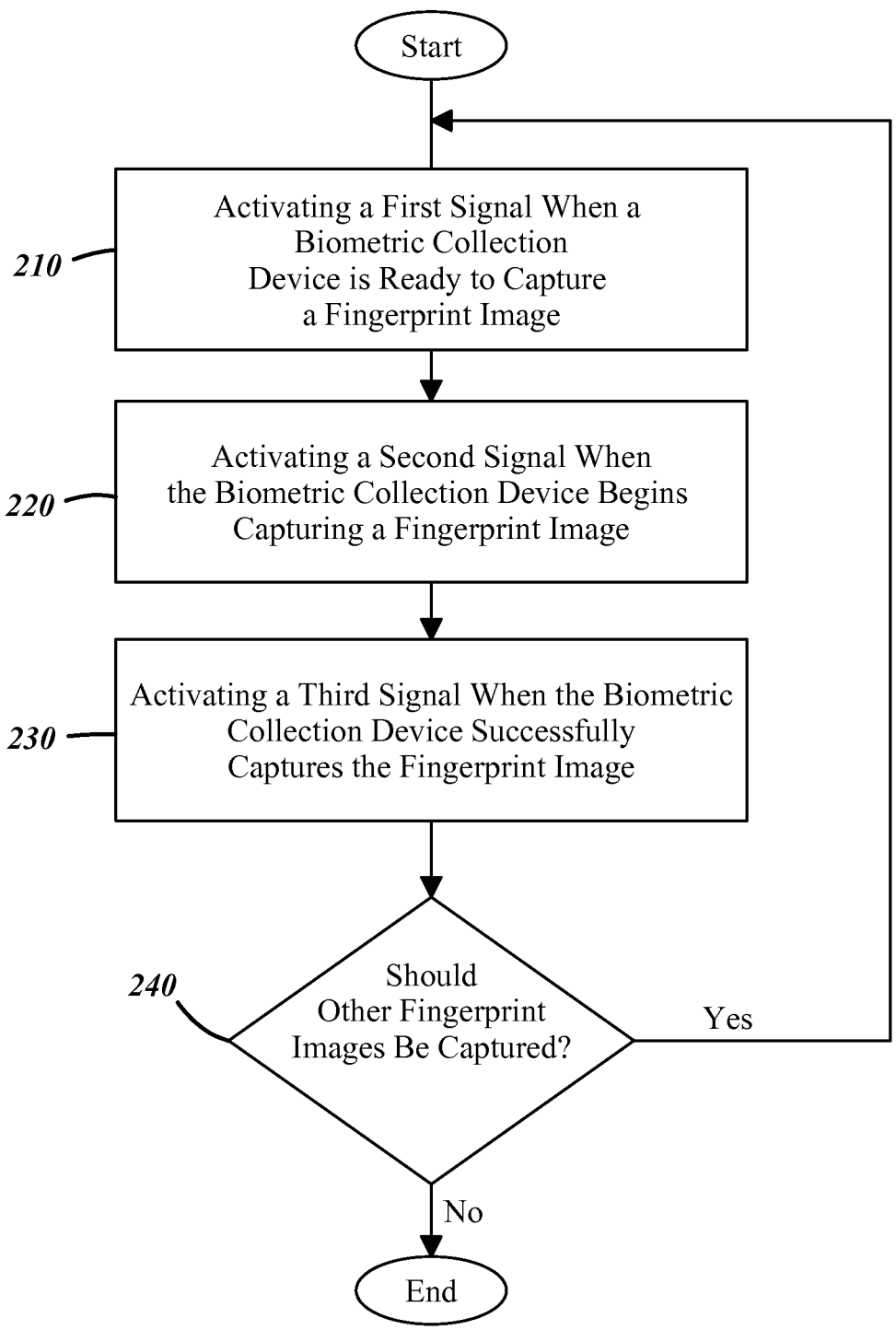
FIG. 2 is a flow chart depicting an embodiment of a method of providing visual cues to a biometric collection device user.

Turning to FIG. 2, a flow chart is shown depicting one embodiment of a method 200 of providing visual cues to a biometric collection device user. As a user of the fingerprint scanner 10 proceeds to scan each finger of a person's hands, the user can place each finger of each hand in contact with the fingerprint sensor 12. The fingerprint scanner 10 can then sequentially capture images of the fingerprints one (or more than one) at a time until images of all fingerprints for a person have been generated and recorded. The fingerprint scanner 10 can guide the user through the use of the fingerprint scanner 10 using a variety of signals that may take a visual, audible, and/or tactile form.

The method 200 begins at step 210 by activating a first signal when the fingerprint scanner 10 is ready to capture a fingerprint image. A signal—first, second, third, or otherwise—can be generated in a unique form that indicates a particular state of the fingerprint scanner 10, such as its readiness to capture fingerprint images. For instance, the signal can be visual in the form of a light having a particular color, intensity, and/or pulse rate. Or the signal can be audible in the form of a unique sound. The unique sound can have a particular tone that is defined by a pitch, duration, intensity, or pulse rate. In addition, the signal could be tactile such that a user can detect the signal through feel. For example, the fingerprint scanner 10 can use an oscillating device that vibrates when activated. The tactile signal can vary in intensity, pulse rate, and/or length to generate a unique signal. The signal can be made unique by choosing from the visual, audible, and/or tactile forms and creating a particular signal understood by the user to be different from other signals the user may receive. With respect to FIG. 2, the signals will be described as visual signals in the form of a light displaying particular colors and/or pulse rates on the visual display 14. A unique signal can be created using a color of a light, the absence/presence/pulsing of the light, a variation in intensity of light, and/or a variation in the rate at which the light pulses. But it should be understood that other types of signals can be used by the fingerprint scanner 10 in accordance with the steps described below. The method 200 described below involves one possible sequence of light colors, absence/presence of pulses, and pulse rate.

In at least one implementation, when the fingerprint scanner 10 is in standby mode ready to begin the process of capturing fingerprint images for each finger, the scanner 10 can constantly or intermittently activate a light using a first color as a first signal. The finger indicator 28 of the visual display 14 can identify which fingerprint the fingerprint scanner 10 will capture by illuminating the light corresponding to that finger in red. For instance, the right hand thumb light 36 can be illuminated constantly at first indicating that the thumb print has yet to be captured. Later, the thumb light 36 can be pulsed using the color red. The intermittent or pulsing activation of the light 36 in red can convey to the user that the fingerprint scanner 10 is ready to capture fingerprint images. The user can then press the scan function to begin the scanning process. In this implementation, the visual display 14 can pulse light according to one of three selected rates: slow, medium, and fast. While the slow, medium, and fast rates could have a variety of different relative rates attributed to them, one exemplary implementation can use rates of 0.5 seconds, 0.25 seconds, and 0.1 seconds, respectively. These rates refer to the length of time the light is illuminated followed by the length of time the light is not illuminated. For example, the slow rate would involve 0.5 seconds of illumination and then 0.5 seconds of non-illumination. Of course, other intervals, including uneven intervals may be used as desired. The method 200 proceeds to step 220.

At step 220, a second signal is activated when the fingerprint scanner begins capturing a fingerprint image. In this embodiment, a light displaying a second color can be intermittently activated when the fingerprint scanner begins capturing a fingerprint image. The finger indicator 28—in this example, the right thumb light 36—can begin displaying or illuminating a yellow light that confirms that the fingerprint scanner 10 is waiting for a finger to be placed on the surface 20 of the fingerprint sensor 12. Once the fingerprint sensor 12 detects the presence of a finger, the thumb light 36 can begin pulsing the yellow light at a slow rate to indicate that the fingerprint scanner 10 detects a finger is in contact with the surface 20 of the fingerprint scanner 12. Depending on whether the fingerprint scanner performs a flat capture or a rolling capture, the yellow light can pulse in different ways. During a flat capture, the yellow light can pulse at the slow rate to indicate both that the fingerprint sensor 12 is in contact with a finger and that the fingerprint scanner 10 is presently capturing a fingerprint image. With respect to a roll capture, the fingerprint scanner 10 can pulse the yellow light at a slow rate to indicate that the fingerprint sensor 12 is in contact with the finger and at a fast or medium rate to indicate that the finger and fingerprint need to be rotated to contact the fingerprint sensor 12 and the fingerprint sensor 10 is presently capturing the fingerprint. The method 200 proceeds to step 230.

At step 230, the fingerprint scanner 10 can activate a third signal when the fingerprint scanner 10 successfully captures the fingerprint image. In this embodiment, the fingerprint scanner 10 can continuously activate a light using a third color when the scanner 10 successfully captures the fingerprint image. Once the fingerprint scanner 10 determines that it has captured an image of the fingerprint, it can illuminate a solid green light. The green light can be generated by the same light that produced the yellow light and/or the red light; or it could be a separate light. Using the example discussed above, the thumb light 36 can stop generating the yellow light and transition to a constantly-illuminated green light to convey that the fingerprint image—in this case the fingerprint image of the right thumb—has been captured. While the right thumb light 36 may be green, other lights representing other fingers that have not be processed to capture fingerprint images can be illuminated by a solid red light. The method 200 proceeds to step 240.

At step 240, the fingerprint scanner 10 can determine if other fingerprint images should be captured. Continuing the example begun above, once the visual display 14 generates a third signal, the fingerprint scanner 10 can standby to capture the other nine fingerprints of a person. The fingerprint scanner 10 can once again generate the first signal to indicate that a different finger will be scanned next. For instance, the visual display 14 can next pulse the index finger light 40 of the right hand in red to indicate that the fingerprint scanner 10 is ready to capture the right index finger. If the user of the fingerprint scanner 10 would like to generate an image of the right index finger, steps 210-230 can be repeated for the right index finger and the progress of capturing the fingerprint of the right index finger can be indicated with the right index finger light 40. In that way, steps 210-230 can be repeated for each of the remaining fingers on both hands until fingerprint images for all of the fingers on both hands are captured. At that time, the finger indicator 28 can constantly or solidly illuminate ten green lights for lights 34-52. Alternatively, the user can choose to selectively capture only a portion of a person's fingerprints by using the skip finger function 58 of the user inputs 16. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method performed by a biometric collection device, comprising:
    conveying a first signal to a user of the biometric collection device in response to the biometric collection device being ready to capture a fingerprint image;
    conveying a second signal to the user in response to the biometric collection device beginning to capture the fingerprint image; and
    conveying a third signal to the user in response to the biometric collection device successfully capturing the fingerprint image,
    wherein the first signal, the second signal, or the third signal is intermittently provided with a slow rate, a medium rate, or a fast rate.

2. The method of claim 1, wherein at least the first signal, the second signal, or the third signal indicates a particular finger to be captured.

3. The method of claim 1, wherein
    the first signal includes a light displaying a red color,
    the second signal includes a light displaying a yellow color, and
    the third signal includes a light displaying a green color.

4. The method of claim 1, wherein the first signal, the second signal, or the third signal is presented to the biometric collection device user via a visual display.

5. The method of claim 1, wherein the first signal, the second signal, and the third signal are audible signals which differ from each other in at least a pitch, a duration, an intensity, or a pulse rate.

6. The method of claim 1, wherein the first signal, the second signal, and the third signal are tactile signals which differ from each other in at least an intensity, a pulse rate or a length of vibration.

7. A method performed by a biometric collection device, the method comprising:
    conveying a first signal to a user of the biometric collection device, the first signal identifying a particular finger to be captured;
    conveying a second signal to the user in response to the biometric collection device being ready to capture a fingerprint image of the particular finger;
    conveying a third signal to the user in response to a fingerprint scanner successfully capturing the fingerprint image of the particular finger; and
    conveying the first signal to the user, the first signal identifying another particular finger to be captured,
    wherein the first signal, the second signal, or the third signal is intermittently provided with a slow rate, a medium rate, or a fast rate.

8. The method of claim 7, wherein at least the first signal, the second signal, or the third signal are displayed by a finger indicator.

9. The method of claim 7, wherein
    the first signal is conveyed to the user as a red color,
    the second signal is conveyed to the user as a yellow color, and
    the third signal is conveyed to the user as a green color.

10. The method of claim 7, wherein the first signal, the second signal, and the third signal are audible signals which differ from each other in at least a pitch, a duration, an intensity, or a pulse rate.

11. The method of claim 7, wherein the first signal, the second signal, and the third signal are tactile signals which differ from each other in at least an intensity, a pulse rate or a length of vibration.

12. A biometric collection device, comprising:
    a housing; and
    a fingerprint sensor, wherein the biometric collection device conveys signals which include a first signal, a second signal and a third signal to a user, the first signal being conveyed to the user in response to the biometric collection device being ready to capture a fingerprint image from the fingerprint sensor, the second signal being conveyed to the user in response to the biometric collection device beginning to capture the fingerprint image, the third signal being conveyed to the user in response to the biometric collection device successfully capturing the fingerprint image,
    wherein the first signal, the second signal, or the third signal is intermittently provided with a slow rate, a medium rate, or a fast rate.

13. The biometric collection device of claim 12, further comprising a visual display including one or more lights that generate the signals.

14. The biometric collection device of claim 13, wherein the one or more lights display a red color, a yellow color or a green color.

15. The biometric collection device of claim 13, wherein the visual display further comprises a finger indicator that includes a plurality of lights each identifying a finger.

16. The biometric collection device of claim 12, wherein the first signal, the second signal, and the third signal are audible signals which differ from each other in at least a pitch, a duration, an intensity, or a pulse rate.

17. The biometric collection device of claim 12, wherein the first signal, the second signal, and the third signal are tactile signals which differ from each other in at least an intensity, a pulse rate or a length of vibration.

* * * * *